(12) United States Patent
Hou

(10) Patent No.: US 8,184,652 B2
(45) Date of Patent: May 22, 2012

(54) SYSTEM AND METHOD FOR LINKING LIST TRANSMIT QUEUE MANAGEMENT

(75) Inventor: Cheng-Liang (Andrew) Hou, Kaohsiung (TW)

(73) Assignee: Broadcom Corporation, Irvine, CA (US)

(*) Notice: Subject to any disclaimer, the term of this patent is extended or adjusted under 35 U.S.C. 154(b) by 2834 days.

(21) Appl. No.: 10/716,529

(22) Filed: Nov. 20, 2003

(65) Prior Publication Data

US 2005/0030962 A1 Feb. 10, 2005

Related U.S. Application Data

(60) Provisional application No. 60/492,958, filed on Aug. 7, 2003.

(51) Int. Cl.
*H04L 12/54* (2006.01)
(52) U.S. Cl. .......................... 370/429; 370/412
(58) Field of Classification Search .................. 370/412, 370/391, 232, 347, 389, 498, 392, 466, 471, 370/472, 474, 401
See application file for complete search history.

(56) References Cited

U.S. PATENT DOCUMENTS

| | | | | |
|---|---|---|---|---|
| 6,137,807 | A * | 10/2000 | Rusu et al. | 370/429 |
| 6,735,679 | B1 * | 5/2004 | Herbst et al. | 711/167 |
| 6,996,117 | B2 * | 2/2006 | Lee et al. | 370/429 |
| 7,065,050 | B1 * | 6/2006 | Herbst | 370/235 |
| 7,088,730 | B2 * | 8/2006 | Hsu et al. | 370/412 |
| 7,145,869 | B1 * | 12/2006 | Kadambi et al. | 370/229 |
| 2003/0081624 | A1 * | 5/2003 | Aggarwal et al. | 370/412 |
| 2004/0095885 | A1 * | 5/2004 | Yang | 370/235.1 |
| 2004/0165609 | A1 * | 8/2004 | Herbst et al. | 370/412 |

* cited by examiner

*Primary Examiner* — Salman Ahmed

(57) ABSTRACT

A linking list transmit queue system includes a queue, packet buffer and buffer tag with one-to-one mapping between them. The packet buffer stores packet data, the buffer tag stores packet data length and the queue stores a linking list of addresses corresponding to the packet data in the order in which the packet data was received from a transmitting network node. The system transmits the stored packet data in the order it was received from the transmitting network node to a destination network node.

17 Claims, 3 Drawing Sheets

SYSTEM AND METHOD FOR LINKING LIST TRANSMIT QUEUE MANAGEMENT

PRIORITY REFERENCE TO PRIOR APPLICATION

This application claims benefit of and incorporates by reference U.S. Patent application No. 60/492,958, entitled "Linking List Queue Management," filed on Aug. 7, 2003, by inventor Cheng-Liang (Andrew) Hou.

BACKGROUND OF THE INVENTION

1. Field of the Invention

This invention relates generally to switches, and more particularly, but not exclusively, to a reduced memory linking list based transmit queue.

2. Description of the Related Art

Networks, such as local area networks (i.e., LANs) and wide area networks (i.e., WANs, e.g., the Internet), enable a plurality of nodes to communicate with each other. Nodes can include computers, servers, storage devices, mobile devices, PDAs, wireless telephones, etc. Networks can include the nodes themselves, a connecting medium (wired, wireless and/or a combination of wired and wireless), and network switching systems such as routers, hubs and/or switches.

The network switching systems route traffic between various nodes of the network. However, in certain circumstances the network switching systems may not be able to instantaneously route traffic to a certain node. For example, if several nodes are transmitting data to a single node, a network switching system may become overloaded with respect to that one node. In another example, the receiving node may be unable to receive data as fast as the transmitting node is transmitting the data. Accordingly, network switching systems require transmit queues (e.g., shared memory) to temporarily store received data.

Conventionally, there are two types of transmit queues that network switching systems use. The simplest and most common is the First-In First-Out (FIFO) continuous memory array. In the continuous memory array, data is written into it in order one cell after another and read out of it in order that the data was written into it. Advantages of the continuous memory arrays are that they are quite simple and direct. Further, all used entries are located continuously, making it simple to retrieve the data entries in order.

A second type of transmit queue is the linking list approach. In a linking list, a memory manager is required to allocate memory in the queue for each data entry. Further, each data entry must also indicate the location of the next data entry since the entries may not be stored continuously as in a continuous memory array. Disadvantages of this type of system is that it is more complex, it requires an extra field in the queue to record location of the next data entry, and a memory management mechanism is needed to determine empty entries in the queue. However, an advantage of this type of system is that it does not require data to be put in any specific order in the queue. Each entry can be put wherever there is free space.

However, a disadvantage of both types of transmits queues is that both require a large amount of memory. For example, a transmit queue using the continuous memory array approach will require at least 1,024 Kbits for 8 transmit queues (1 queue per port). Using a linking list approach requires at least 336 Kbits for 8 transmit queues, which is still relatively large compared to the size of the chip that the network switching system resides on. Further, due to the complexity of the linking list approach, each of the 8 transmit queues will require its own memory manager. Accordingly, a new system and method is needed that enables smaller transmit queues.

SUMMARY OF THE INVENTION

Embodiments of the invention provide an architecture and storage and transmission methods that store packet data in queues more efficiently than conventional-techniques. The storage method comprises receiving a packet; determining an address of a free entry in a queue; placing the determined address in an entry of a prior-determined address in the queue to form a linking list; and placing packet data of the packet in a free entry of a first data structure, wherein there is one-to-one mapping between the queue and the first data structure.

The transmission method comprises: receiving an address in a queue; reading packet data from an entry from a first data structure with the same address as the received address, the queue and the first data structure having one-to-one mapping; transmitting the packet data to a network node associated with the queue; reading a next address in the queue from the received address in the queue; and using the next address to repeat the reading packet data and the transmitting.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
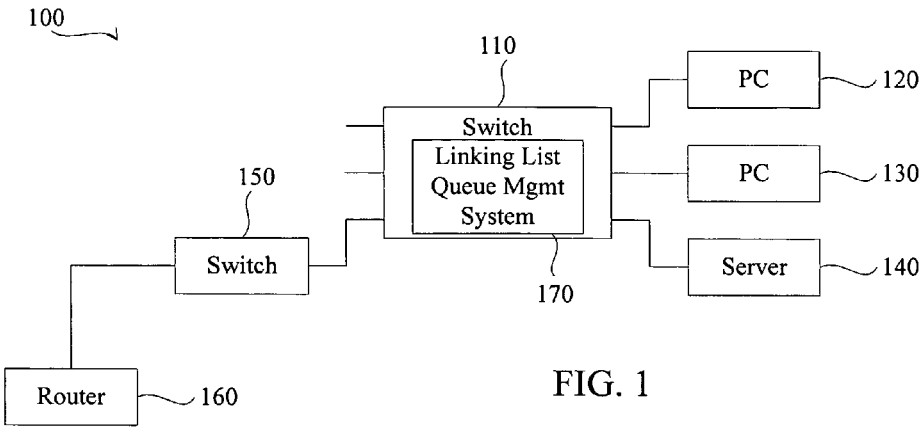
FIG. 1 is a block diagram illustrating a network system in accordance with an embodiment of the present invention.

FIG. 1 is a block diagram illustrating a network system 100 in accordance with an embodiment of the present invention. The network system 100 includes 6 nodes: PCs 120 and 130, a server 140, a switch 110, a switch 150, and a router 160. The switch 150, the PC 120 and 130, and the server 140 are each communicatively coupled, via wired or wireless techniques, to the switch 110. The router 160 is communicatively coupled, via wired or wireless techniques, to the switch 150. It will be appreciated by one of ordinary skill in the art that the network system 100 can include additional or fewer nodes and that the network system 100 is not limited to the types of nodes shown. For example, the switch 110 can be further communicatively coupled to network clusters or other networks, such as the Internet.

The switch 110 includes a linking list queue management system 170, which will be discussed in further detail in conjunction with FIG. 2-FIG. 4. The system 170 routes to and stores data packets in the appropriate memory structures of the system 170 so that the data packets can be transmitted to the appropriate nodes. For example, the system 170 will receive a packet from the PC 120 and store it in a transmit queue for the PC 130.

Figure 2:
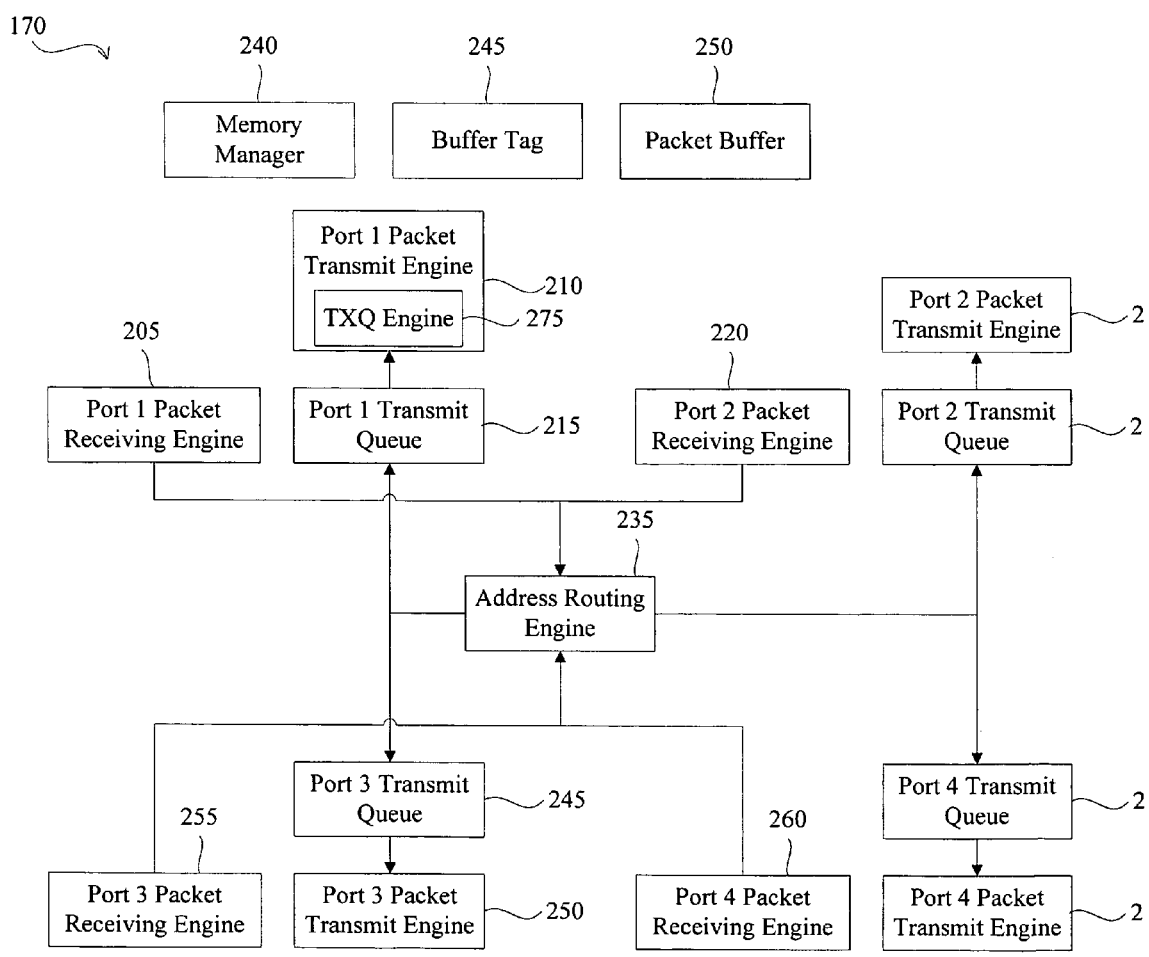
FIG. 2 is a block diagram illustrating a linking list queue management system of FIG. 1.

FIG. 2 is a block diagram illustrating the linking list queue management system 170. It will be appreciated by one of ordinary skill in the art the linking list queue management system 170 can be implemented in other types of network switching systems. For example, the router 160 (FIG. 1) can also include a linking list queue management system 170. The linking list queue management system 170 can be implemented as software, as an ASIC or via other techniques. For each port, there is a packet receiving engine, a transmit queue and a transmit engine. For example, Port 1 includes a Port 1 Packet Receiving Engine 205, a Port 1 Packet Transmit Engine 210 and a Port 1 Transmit Queue 215. While the block diagram of FIG. 2 shows four ports, one of ordinary skill in the art will recognize that fewer or additional ports, e.g., 8 ports, can be used. The system 170 also includes an address routing engine 235, a memory manager 240, a shared buffer tag (BT) 245, and a shared packet buffer (PB) 250.

The receiving engines, such as the Port 1 Packet Receiving Engine 205, receive data packets from a node. In an embodiment of the invention, the data packets can include Ethernet packets of 64 bytes to 1518 bytes in length. The packets include at least a source address, destination address, user defined data and a CRC check field. The packets can also include a Quality of Service (QOS) field that defines the transmission priority of the packets. For example, Voice Over IP (VOIP) packets should be transmitted before ordinary data packets.

The address routing engine 235, using the destination address, routes data corresponding to the received packets to the appropriate transmit queues, e.g., the Port 2 Transmit Queue 230. If the packet is a unicast packet, the packet is routed to only one queue. If the packet is a broadcast packet, the packet is routed to all queues. If the packet is a multicast packet, the packet is routed to the queues corresponding to the destinations specified in the packet. The transmit engines, e.g., the Port 2 Packet Transmit Engine 225, transmits packets corresponding to the data stored in their respective queues to their respective nodes. The transmit engines also each includes a TXQ engine (e.g., the TXQ engine 275 in the port 1 packet transmit engine 210) that stores the address of the next packet in the queue to be transmitted. The TXQ engine stores the address of the next packet at the address of the current packet, thereby forming a linking list. Engines of the memory manager 240 store the user-defined data and/or other packet data of the packet in the packet buffer 250 (or other data structure) and the packet length (or a subset thereof) in the buffer tag 245 (or other data structure). The memory manager 240 also arbitrates when data can be read from or written to the buffer tag 245, the packet buffer 250 and the queues. The memory manager 240 and its operation will be discussed in further detail in conjunction with FIG. 3 and FIG. 4 below. The buffer tag 245 and packet buffer 250 are both universal, i.e., they can store data corresponding to entries in each of the transmit queues 215, 230, 245, and 265, as will be discussed further below.

Figure 3:
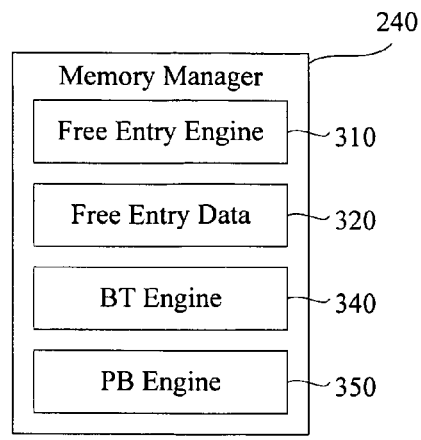
FIG. 3 is a block diagram illustrating the memory manager of the linking list queue management system.

FIG. 3 is a block diagram illustrating the memory manager 240. The memory manager 240 includes a free entry engine 310, free entry data 320, a transmit queue, a buffer tag (BT) engine 340, and a packet buffer (PB) engine 350. The free entry engine 310, using the free entry data 320, keeps track of free space available in the transmit queues 215, 230, 245, and 265 and allocates entries to the TXQ engines, the buffer tag engine 340 and the packet buffer engine 350. The buffer tag engine 340 stores the length of user-defined data in the buffer tag 245. The packet buffer engine 350 stores the user-defined data in the packet buffer 250.

Figure 4:
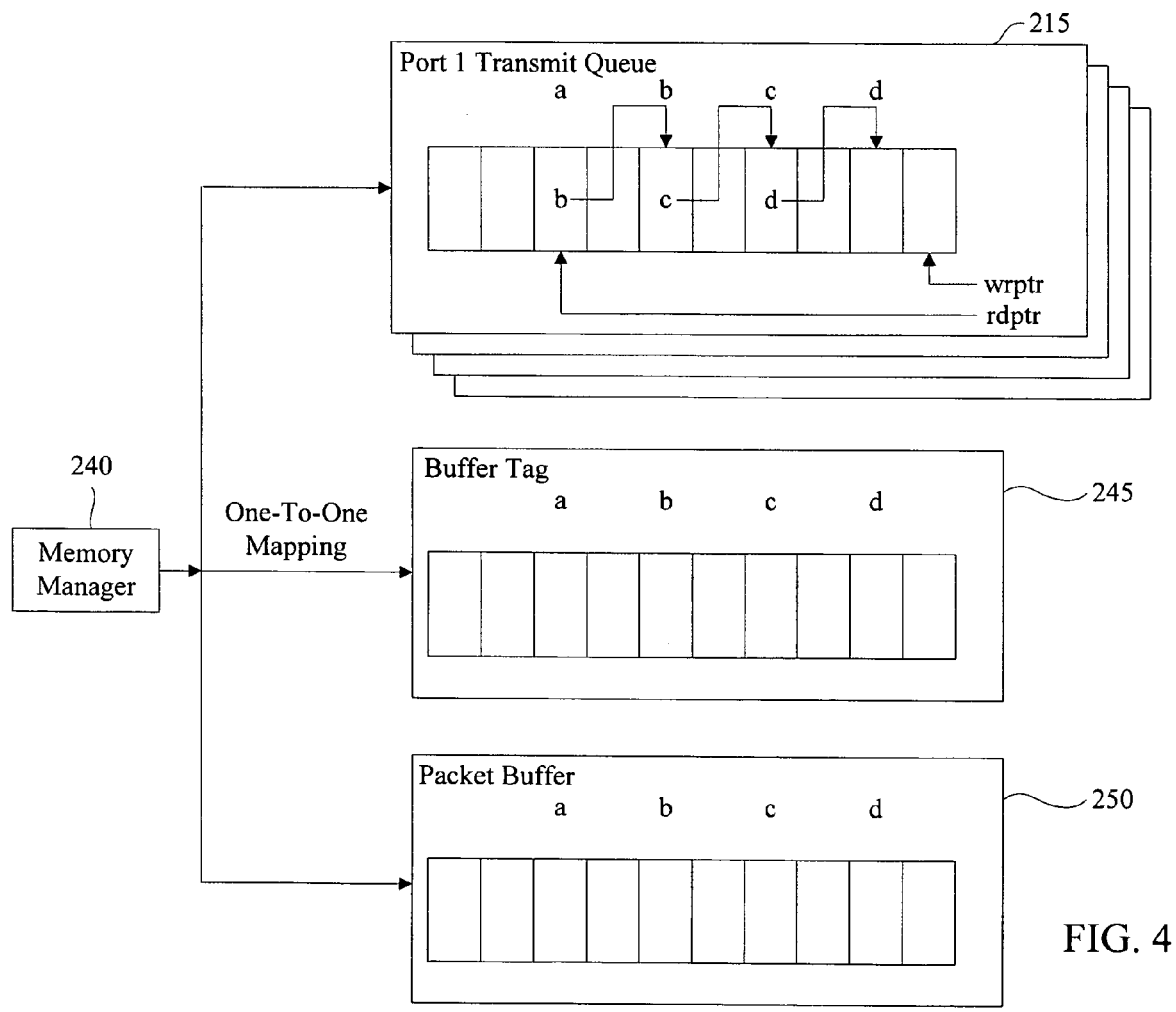
FIG. 4 is a block diagram illustrating the operation of the linking list queue management system.

FIG. 4 is a block diagram illustrating the operation of the linking list queue management system 170. The transmit queues, e.g., the Port 1 Transmit Queue 215 and other transmit queues, are each FIFO linking list memory arrays with 1024 entries. In an embodiment of the invention, each entry can store up to 10 bits to hold the next packet address. Accordingly, each transmit queue is only 10 kbits. For a switch having 8 queues, only 80 kbits are required. In comparison, a conventional switch having 8 transmit queues using a continuous array structure would require 1024 kbits. Alternatively, a switch having 8 transmit queues using a linking list array structure would require 336 kbits. The buffer tag 245 has 1024 entries of 32 bits for a total of 32 kbits. The packet buffer 250 has 1024 entries of 2048 bytes.

The memory manager 240, upon receipt of a packet, splits the packet up and uses the packet buffer engine 350 to store the user-defined data (and/or other packet data) in the packet buffer 250 and uses the buffer tag engine 340 to store the length of the user-defined data or a different subset of the packet or of the entire packet in the buffer tag 245. As illustrated in FIG. 4, there is a one-to-one correspondence or mapping between the transmit queue, e.g., the Port 1 Transmit Queue 215, the buffer tag 245, and the packet buffer 250. In other words, entry a in the transmit queue corresponds with entry a of the buffer tag 245, which corresponds with the entry a of the packet buffer. Accordingly, there is no need for the TXQ engines to store corresponding addresses in the queue 215 or buffer tag 245 for data in the packet buffer 250. The TXQ engines of the port packet transmit engines store the address of the next received and processed packet in the current entry in the transmit queue.

For example, when a unicast packet is received, the free entry engine 310 determines first if the designated queue is empty. Assuming there are already entries in the queue, the free entry engine 310 determines, using the free entry data 320, a next free entry in the queue. The TXQ engine of the associated port transmit queue engine then stores the determined address of the free entry in the most recently used entry, thereby forming a linking list. For example, if the free entry engine 310 determined that entry d is free, the TXQ engine will store the address d in the entry c of the queue. Note that there is no need to separately store the start address as in conventional linking lists as the start address of the next packet is in the transmit queue and corresponds with the address of the buffer tag 245 and packet buffer 250. Further, as the invention uses a linking list approach, an accumulator is not required as in the continuous memory array approach.

The BT engine 340 then stores the packet length in the corresponding entry in the buffer tag 245. Assuming that entry d was determined to be free, the packet length will be stored in entry d of the buffer tag 245. Similarly, the PB engine 350 will store the user-defined data (and/or other packet data) in the corresponding entry in the packet buffer

250. Assuming that entry d was determined to be free, the data will be stored in entry d of the packet buffer 250. After storing the relevant data, the free entry engine 310 updates the free entry data 320 to mark that entry as in use.

If the queue is empty, the free entry engine 310 designates an entry in the queue and updates the free entry data 320 to mark that designated entry is in use. The entry in the queue remains empty (it is filled with the queue address of the next packet when it is received) and the BT engine 340 fills the associated entry in the buffer tag 245 with the packet length. The PB engine 350 fills the corresponding entry in the packet buffer 250 with the user-defined data (and/or other packet data).

For a multicast packet or broadcast packet that is to be directed to more than one node, and therefore more than one queue, the free entry engine 310 determines a free entry in each queue that the packet is supposed to be stored in and then updates the free entry data 320 to indicate that these entries are in use. The TXQ engine then stores determined entry addresses in the last used entry of each respective queue. However, because of one-to-one mapping, the packet length need only be stored in a single corresponding entry in the buffer tag 245 and the actual data need only be stored in a single corresponding entry in the packet buffer 250. Accordingly, each queue entry will refer to the same data in the packet buffer 250. In comparison, although packet data is stored at a packet buffer for all shared packet buffer approaches, conventional queue systems using a continuous array approach required multicast packets (packet address and packet length) to be duplicated in each queue while in this embodiment, the packet length is stored in the shared buffer tag 245, the location/address of each TXQ entry itself is the address of packet. Less memory is therefore required for this embodiment.

For prioritizing packets based on quality of service requirements, separate linking lists can be set up in each queue. For example, 4 separate linking lists can be set up in each queue to buffer packets according to different quality of service levels. In comparison, a conventional continuous array would require additional queues to handle the different quality of service levels. Accordingly, a switch or other device implementing the system 170 can realize additional quality of service levels regardless of the physical structure of each queue.

For transmission, the memory manager 240 provides the first address in a linking list of a transmit queue to the associated packet transmission engine. Since there is one-to-one mapping between the transmit queue, the buffer tag 245 and the packet buffer 250, the packet transmission engine can use the first address to get the associated packet data from the same address in the packet buffer 250 having a length as indicated in the same address of the buffer tag 245. The packet transmission engine then assembles the packet and transmits it to the node attached to the port.

For example, the memory manager 240 provides address a in the Port 1 Transmit Queue to the Port 1 Packet Transmit Engine 210. The Port 1 Packet Transmit Engine 210 then reads address a in the buffer tag 245 to get the packet length and then reads address a in the packet buffer 250 to get the data with the length indicated in address a of the buffer tag 245. The Port 1 Packet Transmit Engine 210 then reconstructs the packet and transmits it to the node communicatively coupled to the Port 1. Further, the free entry engine 310 updates the free entry data 320 to indicate that the most recently read address is now free. If the address is for a multicast or broadcast packet, the free entry engine 310 doesn't update the free entry data 320 to indicate that the most recently read address is free until the packet has been transmitted from all relevant queues.

The Port 1 Packet Transmit Engine 210 can then get the address of the next entry in the linking list by reading address a of the Port 1 Transmit Queue 215, which indicates that address b is the next address. The Port 1 Packet Transmit Engine 210 can then repeat the above-mentioned process until reaching a null value or other end indicator in the Port 1 Transmit Queue 215.

When implementing multiple quality of service levels and therefore multiple linking lists in each queue, the memory manager 240 can provide the first address of each linking list in each queue to the associated packet transmit engine. The packet transmit engine can transmit packets according to their priority (e.g., transmitting all packets in a highest priority queue and then transmitting all packets in the next highest queue, etc.).

Figure 5:
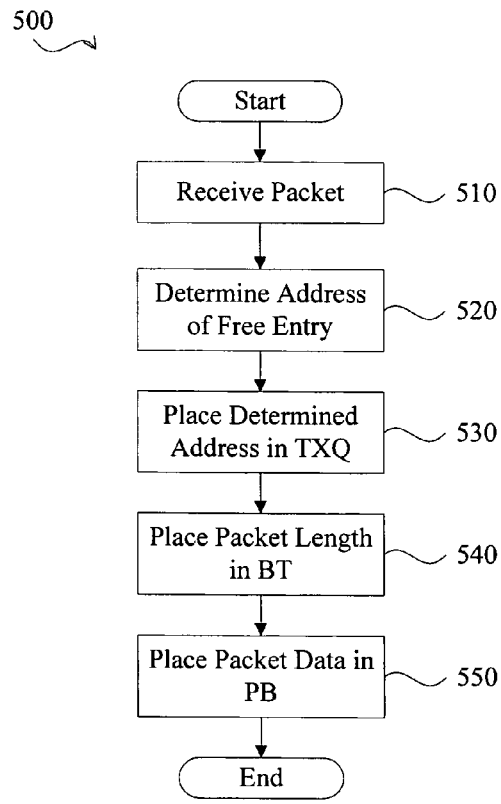
FIG. 5 is a flowchart illustrating a method for storing a packet in the linking list queue management system.

FIG. 5 is a flowchart illustrating a method 500 for storing a packet in the linking list queue management system 170. Multiple instances of the method 500 can be run concurrently and/or sequentially in the linking list queue management system 170. First, a packet is received (510) by, for example, a packet receiving engine of the system 170. Next, an address of a free entry is determined (520) in a queue associated with the port of the destination of the packet. If it is a multicast or a broadcast packet, an address of a free entry in each queue associated with a port associated of the destinations of the packet is determined (520).

After the determining (520), the determined address is placed (530) in the last entry used in the queue, thereby forming a linking list. If this is the first determination, then the address is not placed (530) in the queue. The packet length (e.g., length of the user-defined data and/or other packet data) is then placed (540) in an entry in the buffer tag 245 having the same address as the determined (520) address. The packet data is then placed (550) in an entry in the packet buffer 250 having the same address as the determined address. The method 500 then ends.

It will be appreciated by one of ordinary skill in the art that the placing (530, 540 and 550) can be performed in a different order than described above or can be performed concurrently instead of sequentially. Further, in an embodiment of the invention, the method 500 can further comprise determining a quality of service level for a packet and then placing that packet in an appropriate linking list in the queue based on that determined level.

Figure 6:
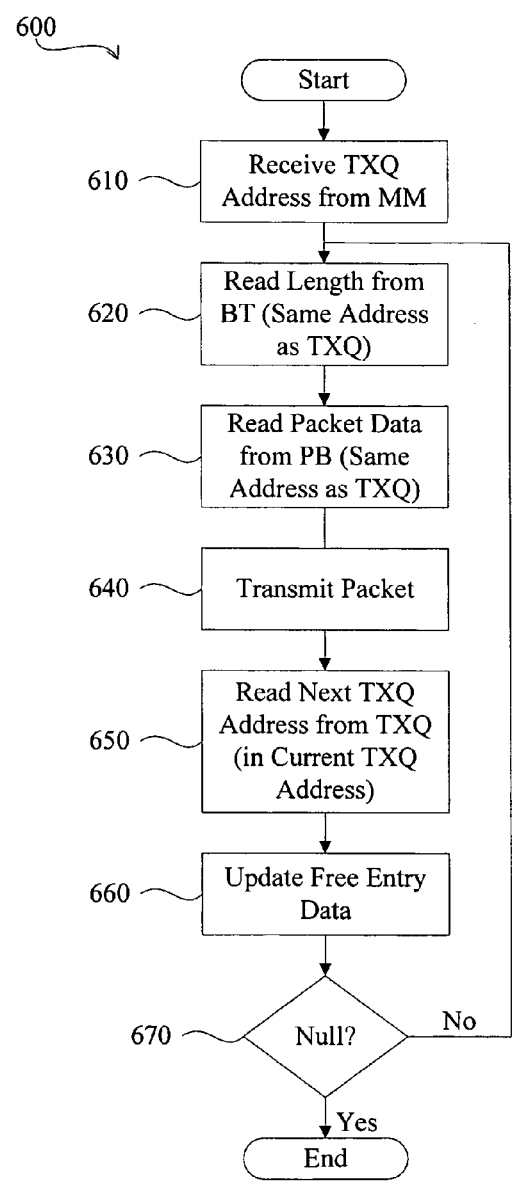
FIG. 6 is a flowchart illustrating a method of transmitting packets stored in the linking list queue management system.

FIG. 6 is a flowchart illustrating a method 600 of transmitting packets stored in the linking list queue management system 170. Multiple instances of the method 600 can be run concurrently and/or sequentially in the linking list queue management system 170. Further, multiple instances of both methods 500 and 600 can be run concurrently and/or sequentially in the linking list queue management system 170.

First, an address in a transmit queue is received (610). Since there is a one-to-one mapping between the queues, the packet buffer 250 and the buffer tag 245, this address is also the address of corresponding entries in the packet buffer 250 and the buffer tag 245 also. Next, the length of the packet or a subset of the packet is read (620) from the buffer tag 245 at the received address (610). The packet data is then read (630) from the packet buffer 250 at the received address. The packet is then reassembled and transmitted (640) to a node associated with the transmit queue. The next address is then read (650) from the queue as indicated in the entry at the current address. The free entry data 320 is also updated (660) to indicate that the most recently read address is now free. However, if the packet is multicast or broadcast, the updating (660) does not occur until the packet has been transmitted from all the relevant queues. The method 600 then repeats from the reading (620) unless the next address indicated is null (670) or otherwise represents the end of the linking list. The method 600 then ends.

The foregoing description of the illustrated embodiments of the present invention is by way of example only, and other variations and modifications of the above-described embodiments and methods are possible in light of the foregoing teaching. Components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, comprising:
receiving a packet;
determining an address of a free entry in a queue;
placing the determined address in an entry of a prior-determined address in the queue to form a linking list; and
placing packet data of the packet in a free entry of a first data structure,
wherein there is one-to-one mapping between the queue and the first data structure.

2. The method of claim 1, wherein the packet is unicast.

3. The method of claim 1, wherein the packet is multicast or broadcast, and further comprising:
determining an address of a free entry in each queue associated with a destination in the packet; and
for each queue associated with a destination in the packet, placing the respective determined address in a respective entry of a prior-determined address in each respective queue.

4. The method of claim 1, further comprising:
determining a priority level for the received packet; and
wherein the placing the determined address places the determined address in an entry of a prior-determined address in the queue having the same priority.

5. The method of claim 4, wherein the determining a priority level includes examining a quality of service field within the received packet.

6. The method of claim 1, further comprising updating free entry data to indicate that the determined address is in use.

7. The method of claim 1, further comprising placing a packet length of the packet in a free entry of a second data structure; and wherein there is one-to-one mapping between the first data structure and the second data structure.

8. A transmit queue system, comprising:
means for receiving a packet;
means for determining an address of a free entry in a queue;
means for placing the determined address in an entry of a prior-determined address in the queue to form a linking list; and
means for placing packet data of the packet in a free entry of a first data structure,
wherein there is one-to-one mapping between the queue and the first data structure.

9. A transmit queue system, comprising:
a first data structure capable of holding a plurality of packet data;
a queue capable of holding a linking list of addresses, the addresses having a one-to-one mapping with addresses in the first data structure;
a packet receiving engine capable of receiving a packet;
a free entry engine coupled to the packet receiving engine and capable of determining an address of a free entry in the queue;
a transmit queue engine, coupled to the queue, the packet receiving engine and the free entry engine, capable of placing the determined address in an entry of a prior-determined address in the queue to form a linking list; and
a packet buffer engine, coupled to the first data structure, the packet receiving engine and the free entry engine, capable of placing packet data of the packet in a free entry of the first data structure.

10. A method, comprising:
receiving an address in a queue;
reading packet data from an entry from a first data structure with the same address as the received address, the queue and the first data structure having one-to-one mapping;
transmitting the packet data to a network node associated with the queue;
reading a next address in the queue from the received address in the queue; and
using the next address to repeat the reading packet data and the transmitting.

11. The method of claim 10, further comprising reading packet length from a second data structure, the second data structure having one-to-one mapping with the first data structure.

12. The method of claim 10, wherein the receiving receives an address for higher priority packet data before receiving an address for lower priority packet data.

13. The method of claim 10, wherein the packet data is multicast or broadcast and the transmitting transmits the packet data to a plurality of network nodes.

14. The method of claim 10, wherein the packet data is unicast.

15. The method of claim 10, further comprising updating free entry data to indicate an address is free after the transmitting.

16. A transmit queue system, comprising:
means for receiving an address in a queue;
means for reading packet data from an entry from a first data structure with the same address as the received address, the queue and the first data structure having one-to-one mapping;
means for transmitting the packet data to a network node associated with the queue;
means for reading a next address in the queue from the received address in the queue; and
means for using the next address to rerun the means for reading packet data and the means for transmitting.

17. A transmit queue system, comprising:
a first data structure holding a plurality of packet data;
a queue holding a linking list of addresses, the addresses having a one-to-one mapping with addresses in the first data structure; and
a packet transmit engine, coupled to the first data structure and the queue, capable of
receiving an address in the queue,
reading packet data from an entry from the first data structure with the same address as the received address,
transmitting the packet data to a network node associated with the queue,
reading a next address in the queue from the received address in the queue, and
using the next address to repeat the reading packet data and the transmitting.

* * * * *